(12) United States Patent
Motegi et al.

(10) Patent No.: US 6,893,345 B2
(45) Date of Patent: *May 17, 2005

(54) IMAGE MUTUAL TRANSFER AND SUCCESSION METHOD OF VIRTUAL IMAGE AND REAL IMAGE

(75) Inventors: Satoshi Motegi, Tokyo (JP); Masatoshi Satoh, Tokyo (JP); Nobuyasu Tamura, Tokyo (JP); Kosaku Noda, Tokyo (JP); Misao Yamanaka, Tokyo (JP); Masanori Suganuma, Tokyo (JP); Hayato Mizue, Tokyo (JP)

(73) Assignee: Konami Corporation, Tokyo (JP)

( * ) Notice: Subject to any disclaimer, the term of this patent is extended or adjusted under 35 U.S.C. 154(b) by 477 days.

This patent is subject to a terminal disclaimer.

(21) Appl. No.: 10/126,072

(22) Filed: Apr. 19, 2002

(65) Prior Publication Data

US 2003/0107530 A1 Jun. 12, 2003

(30) Foreign Application Priority Data

Dec. 11, 2001 (JP) ........................................ 2001-377506

(51) Int. Cl.[7] ................................................. A63F 9/24
(52) U.S. Cl. ........................................... 463/31; 463/34
(58) Field of Search .............................. 463/16, 20–22, 463/30–34; 273/138.1, 139, 138.2, 143 R; 345/4–6

(56) References Cited

U.S. PATENT DOCUMENTS

2002/0077172 A1 * 6/2002 Uchiyama et al. ............ 463/20
2003/0094760 A1 * 5/2003 Motegi et al. ............... 273/292
2003/0107530 A1 * 6/2003 Motegi et al. .................. 345/6
2003/0119577 A1 * 6/2003 Motegi et al. ................ 463/20
2003/0130034 A1 * 7/2003 Suganuma et al. ........... 463/30
2004/0062025 A1 * 4/2004 Satoh et al. .................. 362/27

FOREIGN PATENT DOCUMENTS

| JP | 07-136345 | 5/1995 |
| JP | 08-309023 | 11/1996 |
| JP | 08-323037 | 12/1996 |
| JP | 11-114221 | 4/1999 |
| JP | 11-151352 | 6/1999 |

* cited by examiner

*Primary Examiner*—Derris H. Banks
*Assistant Examiner*—Alex F. R. P. Rada, II
(74) *Attorney, Agent, or Firm*—Welsh & Katz, Ltd.

(57) ABSTRACT

An object of the present invention is to provide an image mutual transfer and succession method between a virtual image and a real image capable of performing the smooth transfer between the display of a virtual image of a real item and the display of a real image, realizing the successful combination of the reality of the real item and the fantasy of the real image, and enabling a rich representation.

The image mutual transfer and succession method between a virtual image and a real image according to the present invention performs take-over control of mutual images by structuring the real image of the display to be apparently identical to the virtual image, displaying the real image on the display in synchronization with the dimming of illumination to the real item when displaying the real image, and brightening the illumination to the real item in synchronization with the stoppage of the real image display on the display device when displaying the virtual image.

2 Claims, 9 Drawing Sheets

IMAGE MUTUAL TRANSFER AND SUCCESSION METHOD OF VIRTUAL IMAGE AND REAL IMAGE

BACKGROUND OF THE INVENTION

1. Field of the Invention

The present invention relates to an image mutual transfer and succession method of a virtual image and real image, and more particularly to a method of transferring a virtual image display reflecting a real item on a half mirror into a real image display, or transferring a real image display into a virtual image display reflecting a real item on a half mirror.

2. Description of the Related Art

Conventionally, as a game machine employing an image display device using a virtual image, there is a target-hammering game device disclosed in the specification of Japanese Patent Application Laid-Open No. 8-323037.

This target-hammering game machine displays the target image projected on the CRT screen to the player by synthesizing the virtual image of the hammering table pursuant to the operation of a half mirror and the mirror image of the hammer held by the player.

Upon playing the game, the player plays the game while viewing the screen of the image display device, and swings the hammer such that the hammer, which is a mirror image, collides with the target image.

When the player hammers the target image successfully, the shock sensor detects this hammering motion and outputs a signal, and, based on such signal, the image control device switches the target image on the CRT screen to a direct hit effect image.

In addition, there is a synthesized image display device, game device and bowling game device disclosed in the specification of Japanese Patent Application Laid-Open No. 11-114221.

This synthesized image display device synthesizes an actual ball and an image ball and displays this to the observer, and comprises a CRT display for displaying images, and a mirror for forming a reflective virtual image of such image.

Upon playing the game, the actual ball rolled by the player rolls on the traveling face, passes by the mirror, and moves further toward the back.

Then, when the actual ball passes by the half mirror portion of the mirror, an image ball having the same outer appearance as the actual ball appears, and the actual ball switches to this image ball.

In other words, after the actual ball hides behind the mirror, the image ball as the reflective virtual image continues the movement.

In addition, the game device disclosed in the specification of Japanese Patent Application Laid-Open No. 11-104311 structures a variable display device with a rotational drum having a special design on the peripheral face thereof; a drum lamp capable of illuminating light to the special design of the rotational drum; a half mirror which visibly transmits the special design pursuant to the illumination from the drum lamp; and a projection display mechanism capable of projecting and displaying the projected image on the half mirror, and the projection display mechanism projects and displays the character design as the projected image on the half mirror.

According to the foregoing structure, provided is a mechanically variable display device capable of displaying a character design in addition to the display of a special design, and the ornamental visual effect is thereby improved.

Meanwhile, as described above, the target-hammering game machine disclosed in Japanese Patent Application Laid-Open No. 8-323037 executes the game with the virtual image of the hammer and the background image thereof by employing a half mirror, and merely represents the actual whack-a-mole game machine, which is a well-known and popular game, with an image. Thus, this merely displays a virtual image and does not have a switching structure.

With the synthesized image display device, game device and bowling game device disclosed in the specification of Japanese Patent Application Laid-Open No. 11-114221, when the actual ball rolled by the player hides behind the backside of the mirror, an image ball as the reflective virtual image continues the movement. Although this yields an advantage in that the occupancy space of the game device can be reduced and the device itself can be simplified by spatially disposing the portion of the real item and the portion of the reflective virtual image separately, the real item in the game machine is merely replaced with an image representation, and thereby lacks variety and diversity.

Moreover, since an actual ball is moved, a large space is required, and there is a problem in that the game device will become large.

With the game device disclosed in the specification of Japanese Patent Application Laid-Open No. 11-104311, the player visually recognizes the special design of the rotational drum via the half mirror. Although the projected image is overlapped on the special design of the rotational drum and projecting and displaying the same, the display to the player is mainly structured of the special design of the rotational drum, and this merely adds an image representation employing a virtual image to the periphery of the special design of the rotational drum.

SUMMARY OF THE INVENTION

The present invention was devised in view of the foregoing circumstances, and an object thereof is to provide an image mutual transfer and succession method of a virtual image and a real image capable of performing the smooth transfer from the display of a virtual image of a real item and the display of a real image, realizing the successful combination of the reality of the real item and the fantasy of the real image, and enabling a rich representation.

In order to achieve the foregoing object, the first aspect of the present invention provides an image mutual transfer and succession method between a virtual image and a real image which switches, as required, between display of a virtual image of a real item as a reflected image by a half mirror and display of a real image as a half mirror transmitted image from a display provided behind said half mirror; wherein mutual take-over control of images is performed by structuring the real image by said display to be apparently identical to said virtual image, displaying the real image on said display in synchronization with the dimming of illumination to said real item when displaying the real image, and brightening the illumination to said real item in synchronization with the stoppage of the real image display on said display device when displaying the virtual image.

According to the foregoing structure, the transfer and succession between the virtual image display and real image display can be conducted smoothly with the observer hardly noticing.

Further, similar to a structure of visually recognizing a real item, the successful combination of the reality of the real item and the fantasy of the real image is realized.

Moreover, by transferring the virtual image display of a real item to the display of a real image, realized is a display employing a real image for changes in the mode of the real item, which is not possible in a structure displaying the real item.

The image mutual transfer and succession method of a virtual image and a real image according to the second aspect of the present invention is the image mutual transfer and succession method of a virtual image and a real image of the first aspect described above, wherein the real item is a design drawn on the peripheral face of a mechanical reel.

According to this structure, the transfer and succession between the virtual image of the design on the mechanical reel peripheral face and real image can be conducted smoothly with the observer hardly noticing.

Therefore, by transferring the virtual image display of the design on the mechanical reel peripheral face to the display of a real image, realized is a display employing a real image for changes in the mode of the mechanical reel, which is not possible in a structure displaying the real item.

Further, similar to a structure of visually recognizing an actual mechanical reel, the successful combination of the realistic game display of the real item and the virtualistic game display of the real image is realized.

DESCRIPTION OF THE PREFERRED EMBODIMENTS

The present invention is now described in detail with reference to the drawings representing the embodiments.

Figure 1:
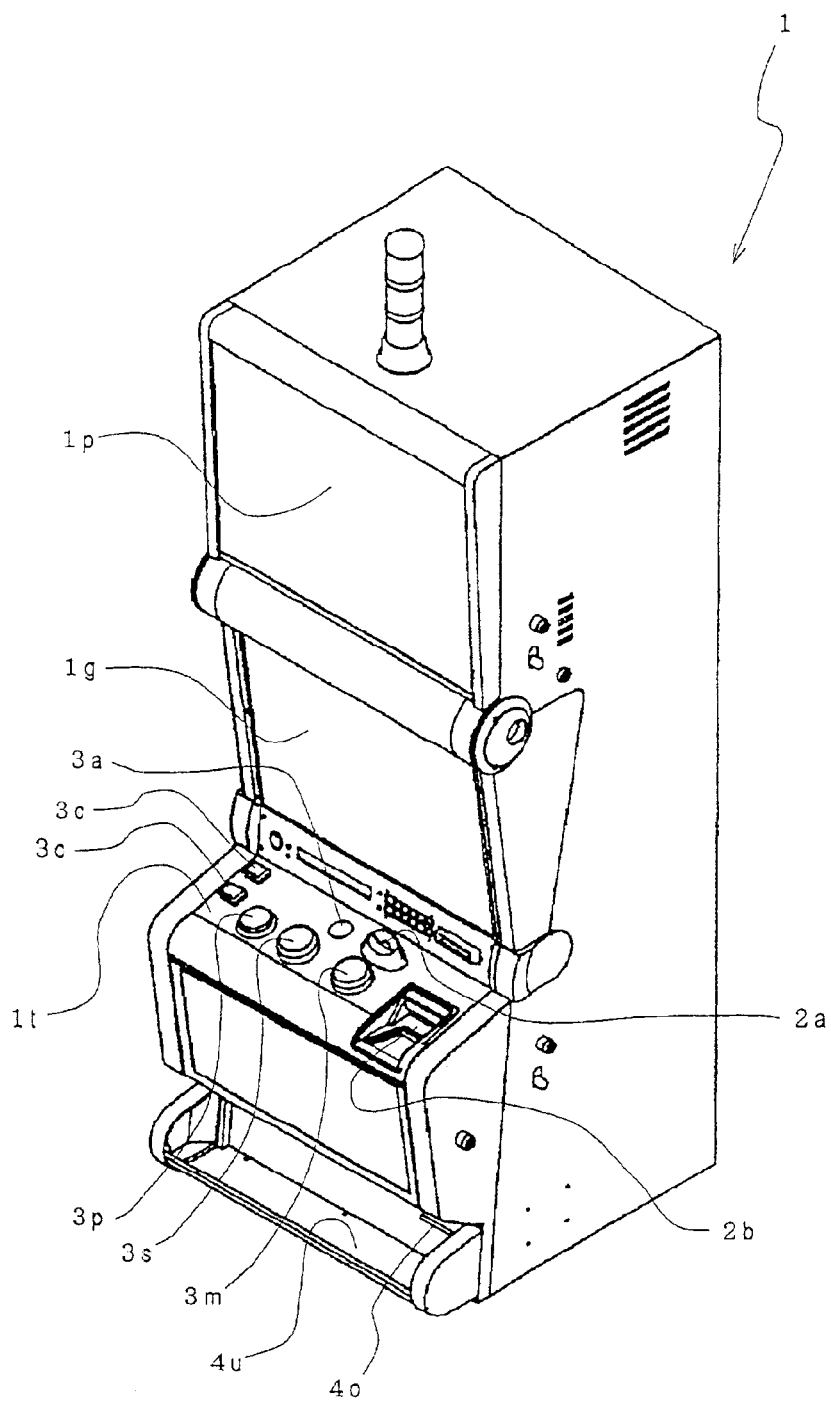
FIG. 1 is a perspective view showing the appearance of the slot game machine, which is an embodiment of the image mutual transfer and succession method of a virtual image and real image according to the present invention.
Figure 2:
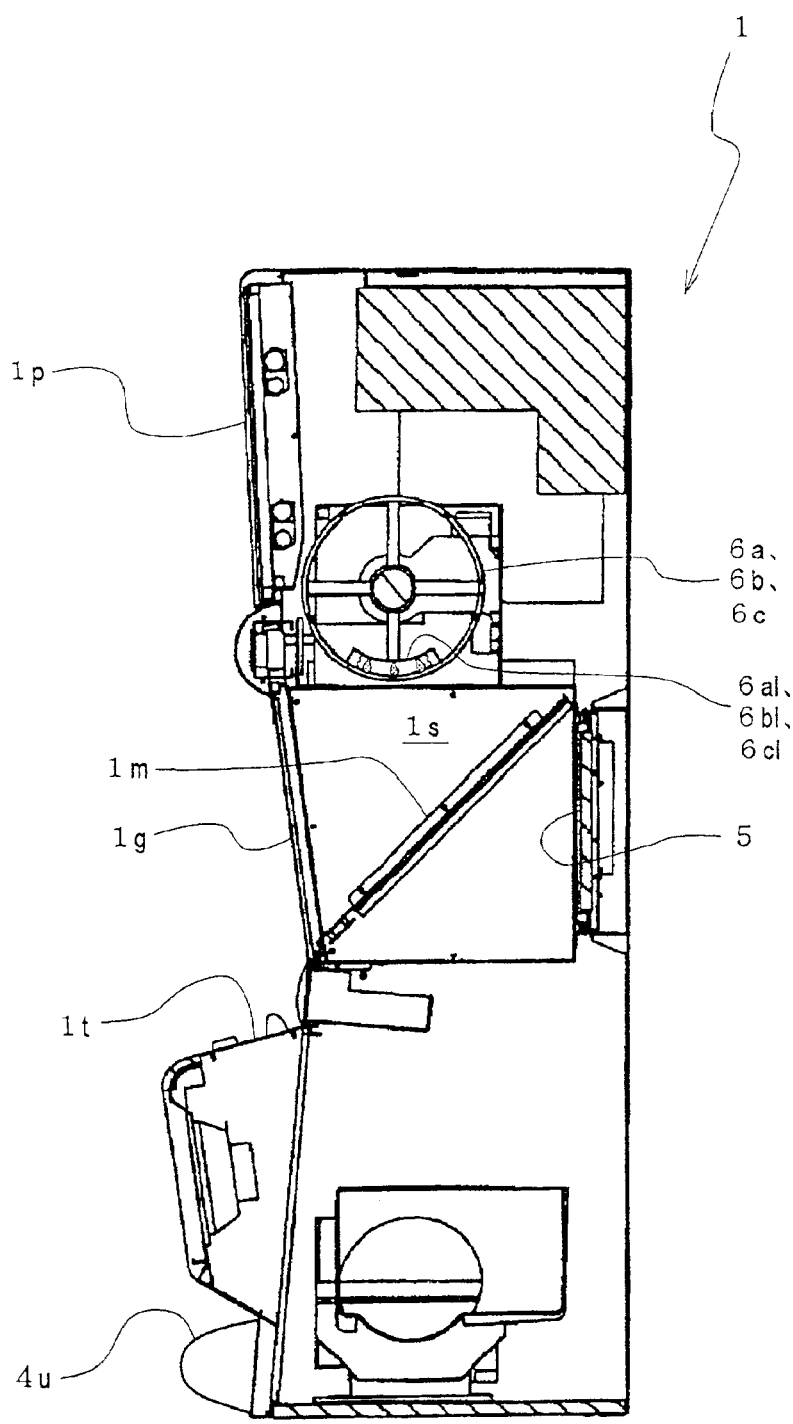
FIG. 2 is a longitudinal cross section from the side of the principal portion of the slot game machine illustrated in FIG. 1.

FIG. 1 is a perspective view of the appearance of the slot game machine 1 employing the present invention. FIG. 2 is a longitudinal cross section from the side of such slot game machine 1.

Figure 3:
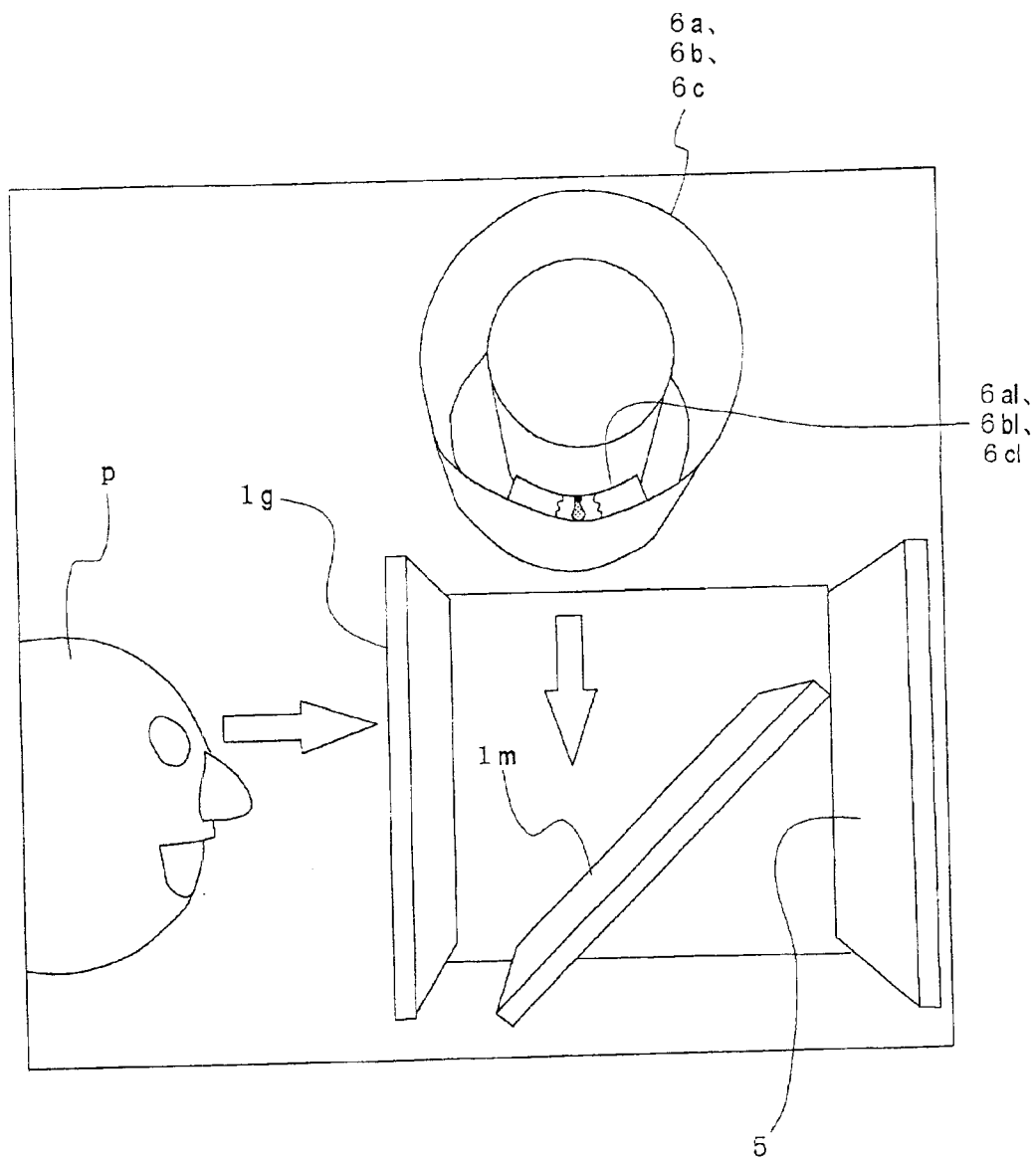
FIG. 3 is a diagram conceptually showing the structure of the principal portion of the slot game machine illustrated in FIG. 1.

In the slot game machine 1, as shown in FIG. 1, FIG. 2 and FIG. 3, a liquid crystal display panel (display) 5 is provided at a position facing the player p in a protective glass 1g through which the player p sees, a half mirror 1m is provided in front of the crystal display panel 5 in a lowered and inclined manner, and one set of mechanical reels 6a, 6b, 6c is disposed within the top box 1p above the half mirror 1m.

An illumination-adjustable reel lamp I (6al), reel lamp II (6bl) and reel lamp III (6cl) for illuminating the designs (real item) 6an, 6bn, 6cn drawn respectively on the peripheral face of the mechanical reels 6a, 6b, 6c are disposed within the mechanical reels 6a, 6b, 6c.

The slot game machine 1 comprises a virtual image display mode and a real image display mode as its game display mode.

Figure 4:
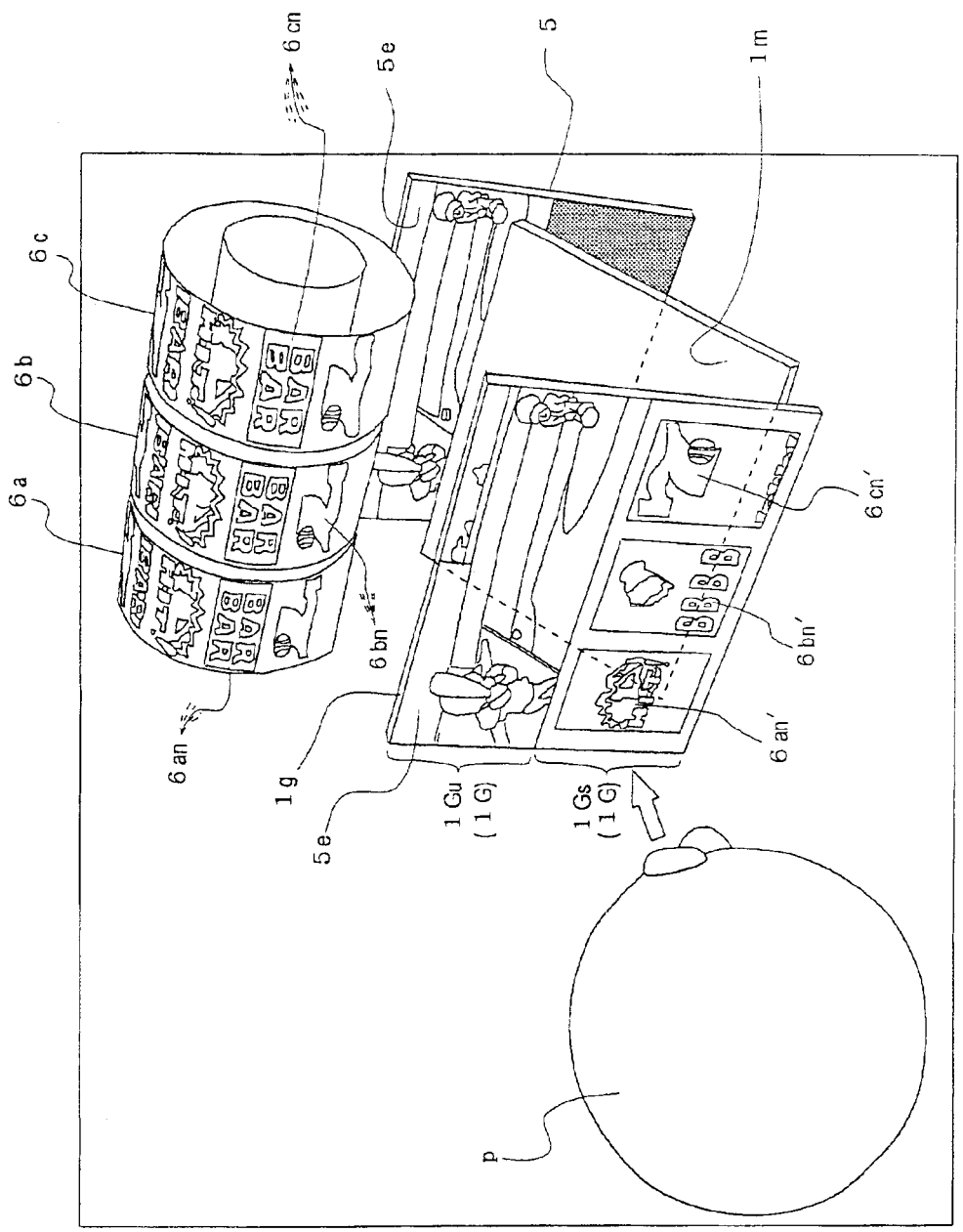
FIG. 4 is a conceptual diagram showing the display during the game off the slot game machine illustrated in FIG. 1.

For example, as shown in FIG. 4, which is a conceptual diagram during the game, the slot game machine 1 foremost displays through the half mirror 1m the image 5e displayed on the upper area of the liquid crystal display panel 5 on the upper half area 1Gu of the game display through the protective glass 1g as the virtual image display mode, and displays the virtual images 6an', 6bn', 6cn' of the designs 6an, 6bn, 6cn of the peripheral faces of the mechanical reels 6a, 6b, 6c reflected on the half mirror 1m on the lower half area 1Gs of the game display.

Figure 7:
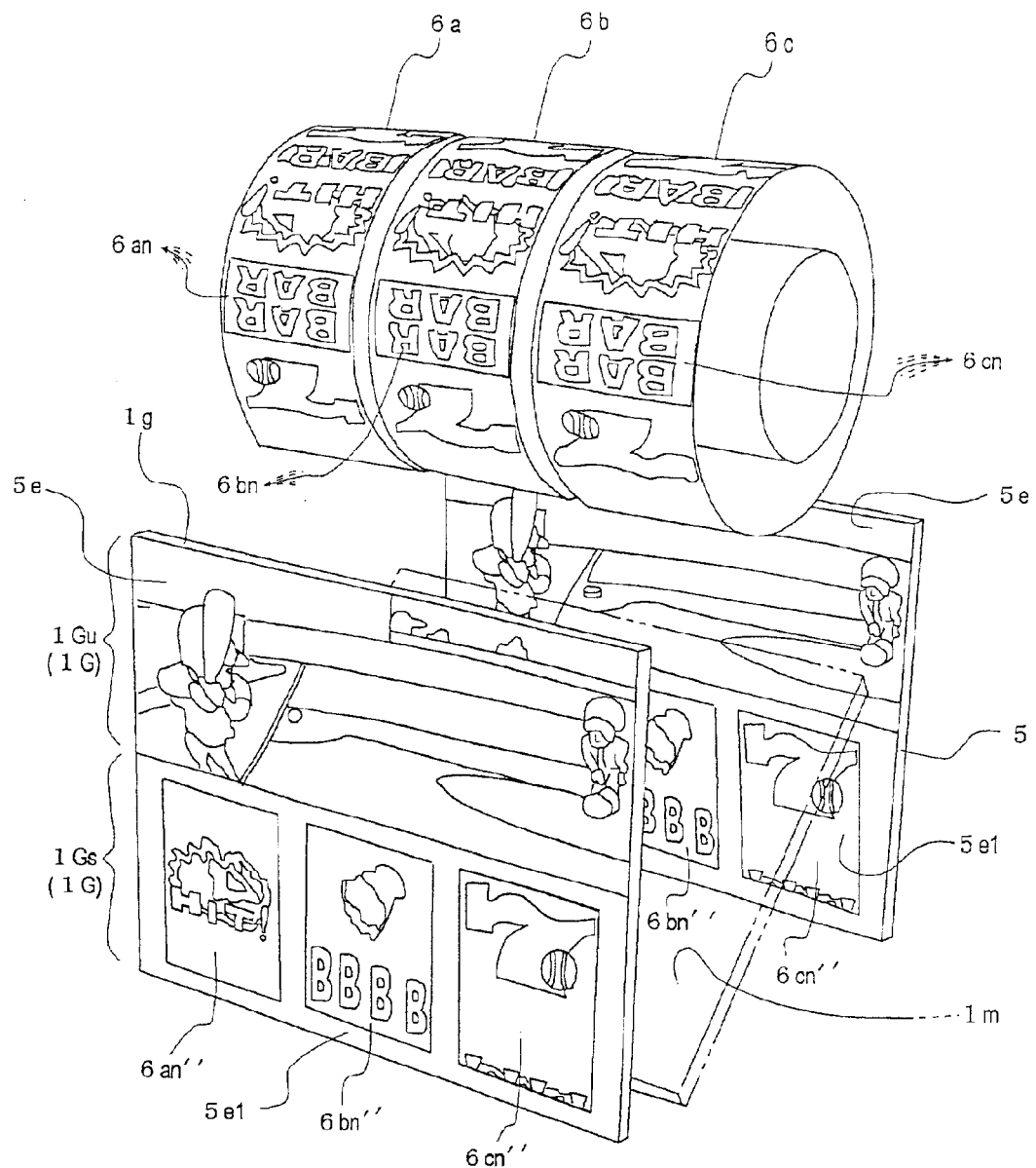
FIG. 7 is a conceptual diagram showing, in the slot game machine illustrated in FIG. 1, the structure of a game display in which an image is displayed with a liquid crystal display panel at the upper half area in the game display, and an image design of the reel peripheral face image is displayed with a liquid crystal display panel at the lower half area in the game display.

Next, the reel lamps 6al, 6bl, 6cl are turned off in order to stop the illumination to the designs 6an, 6bn, 6cn of the respective peripheral faces of the mechanical reels 6a, 6b, 6c so as not to display the virtual images 6an', 6bn', 6cn' of the designs 6an, 6bn, 6cn, and, in synchronization therewith, as shown in FIG. 7, a reel peripheral face image 5el having image designs (real images) 6an", 6bn", 6cn" identical with and positioned the same as the virtual images 6an', 6bn', 6cn' of the designs 6an, 6bn, 6cn of the peripheral face of the mechanical reels 6a, 6b, 6c is displayed on the lower half area 1Gs of the liquid crystal display panel 5, and transfers the virtual image display mode to the real image display mode by displaying the image 5e and the reel peripheral face image 5el on the entire area of the game display 1G within the protective glass 1g.

Contrarily, when transferring the real image display mode to the virtual image display mode, foremost, as the real image display mode, as shown in FIG. 7, the image 5e and the reel peripheral image 5el having image designs 6an", 6bn", 6cn" are displayed on the entire area of the liquid crystal display panel 5, and the image 5e and the reel peripheral face image 5el are displayed across the entire area 1G of the game display within the protective glass 1g.

Figure 6:
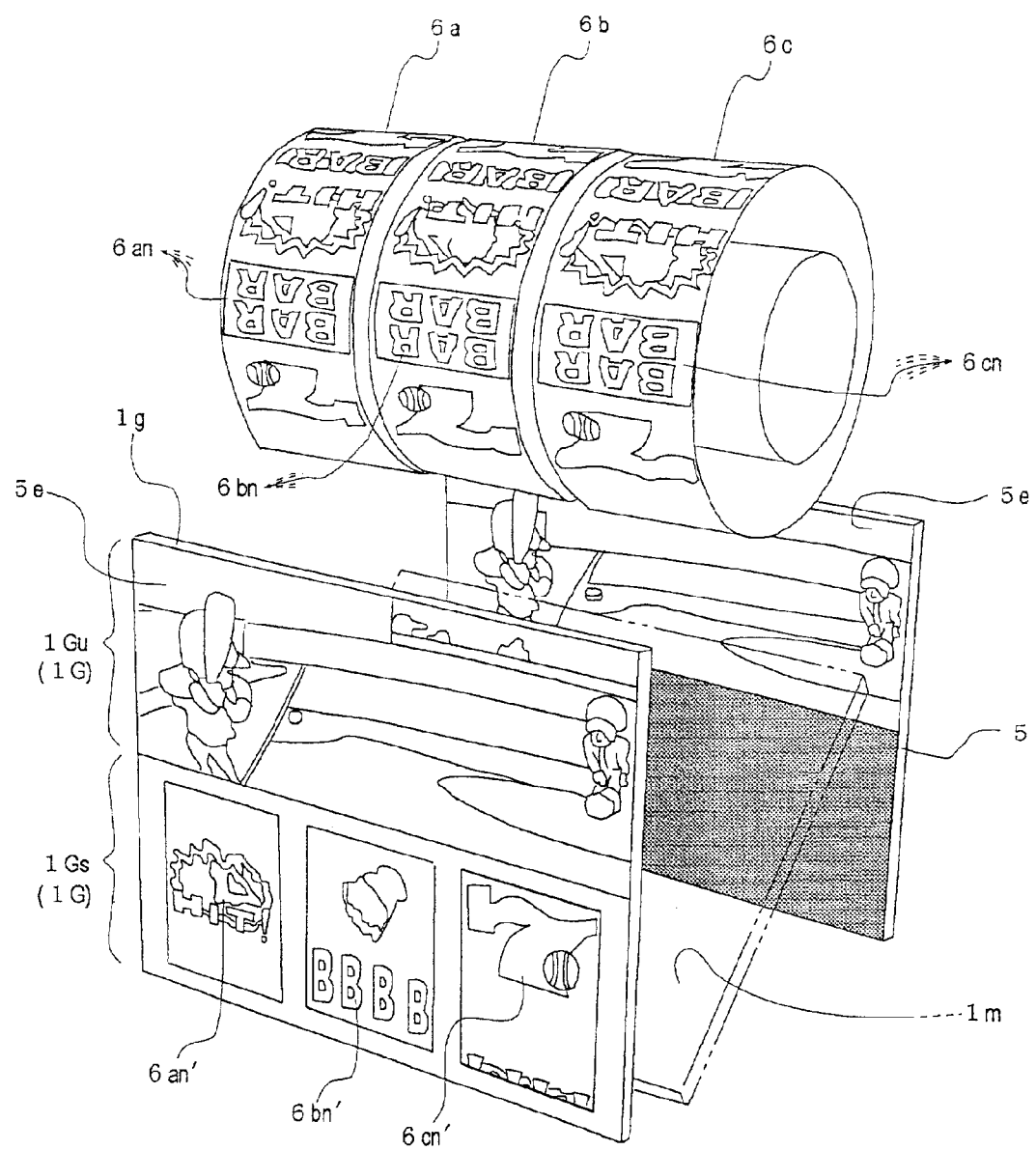
FIG. 6 is a conceptual diagram showing, in the slot game machine illustrated in FIG. 1, the structure of a game display in which an image is displayed with a liquid crystal display panel at the upper half area in the game display, and a virtual image of the design of the mechanical reel peripheral face at the lower half area in the game display.

Next, as shown in FIG. 6, the reel peripheral face image 5el of the liquid crystal display panel 5 is non-displayed and a dark color is displayed in place thereof, and, in synchronization therewith, the reel lamps 6al, 6bl, 6cl are turned on to illuminate the designs 6an, 6bn, 6cn of the peripheral face of the mechanical reels 6a, 6b, 6c so as to be reflected with the half mirror 1m, and the virtual images 6an', 6bn', 6cn' of the designs 6an, 6bn, 6cn of the peripheral face of the mechanical reels 6a, 6b, 6c identical with and positioned the same as the non-displayed image designs 6an", 6bn", 6cn" are displayed, thereby transferring the real image display mode to the virtual image display mode.

As described above, the slot game machine 1 comprises a virtual image display mode and a real image display mode as its game display mode, and is capable of transferring, when appropriate, the virtual image display mode to the real image display mode, or from the real image display mode to the virtual image display mode.

As shown in FIG. 1 and FIG. 2, provided to the front face of the aforementioned slot game machine 1 is an operational table 1t which is protrusively provided in an anteriorly inclined manner at a position where the player p can manually operate the same with ease. Moreover, a transparent protective glass 1g is provided above the operational table 1t so as to enable the player p to see the game space 1s within the slot game machine 1 as well as to protect the same.

Further, as shown in FIG. 2, a top box 1p housing the mechanical reels 6a, 6b, 6c is formed above the slot game machine 1.

As shown in FIG. 2 and FIG. 3, a liquid crystal display panel 5, which is a flat panel display, is provided in the game space is protected with the protective glass 1g at a position facing the player, and a half mirror 1m is disposed at a declining and inclining angle of 45° toward the player side.

Moreover, although the inclination angle of the half mirror 1m is set to 45°, it goes without saying that the inclination angle may be set to an angle other than 45° so as long as the designs 6an, 6bn, 6cn of the peripheral face of the mechanical reels 6a, 6b, 6c are reflected on the half mirror 1m, and the player p is able to visually recognize each virtual image 6an', virtual image 6bn' and virtual image 6cn'.

Further, although a liquid crystal display panel 5 is used as the image display device for displaying the game image in the present embodiment, needless to say, other image display devices, such as a plasma display panel, for example, may be used in place of the liquid crystal display panel 5.

Moreover, as shown in FIG. 2, the mechanical reels 6a, 6b, 6c are housed in the top box 1p and disposed above the half mirror 1m, and, as shown in FIG. 4, the player p visually recognizes the virtual images 6an', . . . , 6bn', . . . , 6cn', . . . , in which the design 6an, design 6bn and design 6cn on the peripheral face of the mechanical reels 6a, 6b, 6c are reflected on the half mirror 1m, at the lower half area 1Gs of the game display within the protective glass 1g.

The aforementioned mechanical reels 6a, 6b, 6c are formed having a contour of a drum shape, and, at the respective peripheral faces of the mechanical reels 6a, 6b, 6c, attached thereto are a design sheet having as its material polycarbonate or the like to which the design 6an, . . . is to be drawn, a design sheet having as its material polycarbonate or the like to which the design 6bn, . . . is to be drawn, and a design sheet having as its material polycarbonate or the like to which the design 6cn, . . . is to be drawn.

The aforementioned design 6an, . . . , design 6bn, . . . and design 6cn, . . . are classified, for example, as a design with a specific hand such as the number 7, or other general designs.

The mechanical reels 6a, 6b, 6c structured as described above are each axially supported rotatably around the concentric axis extending horizontally in the left and right directions of the slot game machine 1, and they respectively have favorable consistency with digital control systems, and are rotatably driven independently in a direct drive with a stepping motor (not shown) which rotates in a prescribed angle.

And, in order to make each of the mechanical reels 6a, 6b, 6c stop at a prescribed position determined with internal drawing, a position sensor I (22a), position sensor II (22b) and position III (22c) (c.f FIG. 5) are respectively applied for each mechanical reel 6a, 6b, 6c for performing position control.

Moreover, light sensors such as photodiodes and phototransistors are suitably selected and used as the position sensors 22a, 22b, 22c.

Further, needless to say, the rotational drive of the mechanical reels 6a, 6b, 6c may suitably adopt a transmission mechanism employing a transmission belt or a gear mechanism.

And, as shown in FIG. 2 and FIG. 3, a reel lamp I (6al), reel lamp II (6bl) and reel lamp III (6cl) for illuminating and conspicuously displaying the design 6an, . . . , 6bn, . . . , 6cn, . . . on the peripheral face of the mechanical reels 6a, 6b, 6c are disposed respectively within the mechanical reels 6a, 6b, 6c.

Here, illumination of the reel lamp I (6al), reel lamp II (6bl) and reel lamp III (6cl) can be adjusted pursuant to the increase or decrease of the current, and, by suitably adjusting the illuminance thereof, the design 6an, . . . , 6bn, . . . , 6cn, . . . on the peripheral face of the mechanical reels 6a, 6b, 6c can be displayed in various clearness as the virtual images 6an', . . . , 6bn', . . . , 6cn', . . . by being reflected on the half mirror 1m.

For example, sharp and clear virtual images 6an', . . . , 6bn', . . . , 6cn', . . . can be displayed by increasing the illuminance of the reel lamp 6al, 6bl, 6cl, and obscure and unclear virtual images 6an', . . . , 6bn', . . . , 6cn', . . . can be displayed by decreasing the illuminance. Further, by reducing the illuminance to the lowest point, the designs 6an, . . . , 6bn, . . . , 6cn, . . . on the peripheral face of the mechanical reels 6a, 6b, 6c will no longer be displayed as the virtual images 6an', . . . , 6bn', . . . , 6cn', . . . by being reflected on the half mirror 1m, thereby realizing a non-display.

Moreover, although the reel lamps 6al, 6bl, 6cl are respectively and internally disposed in the mechanical reels 6a, 6b, 6c in the present embodiment, they may be provided outside the mechanical reels 6a, 6b, 6c.

As shown in FIG. 1, a coin slot 2a for inserting a coin for the player p to bet on the slot game and a bill slot 2b for inserting the bill for the player to bet on the slot game are provided on the operational table 1t.

Further provided on the operational table 1t are a unit bet button 3p for betting a single unit each time a unit betting amount; for example, 5 cents, 25 cents, 1 dollar, is pressed per game established peculiarly to the slot game machine 1; a maximum bet button 3m for betting a maximum unit betting amount; for example, 3 unit betting amount or 5 unit betting amount established peculiarly to the slot game machine 1 and simultaneously starting the rotation of the mechanical reels 6a, 6b, 6c; and a bet display unit 3a for displaying how many units have been bet.

In addition, further provided to the operational table 1t are a play button 3s for starting the rotation of the mechanical reels 6a, 6b, 6c; a change button 3c for calling a clerk to exchange money; and a cash out button 3o for dispensing accumulated cash of the balance upon subtracting the amount used in the game from the wager inserted into the coin slot 2a or bill slot 2b by the player p, and the acquired dividend of the prize won in the slot game.

Moreover, a ticket out opening 4o is provided to the lower wall face of the operational table 1t at the front face of the slot game machine 1, and there are cases where an exchange ticket of the payout amount is ejected from such ticket out opening 4o instead of cash.

A payout receiver 4u is provided at the lower part of the ticket out opening 4o by protruding anteriorly from the wall face, and the exchange ticket ejected from the ticket out opening 4o, or when the settlement of the game is made in cash, the paid out coins are retained in a hopper (not shown) when the game is finished.

Next, the structure of the control unit of the slot game machine 1 is described.

Figure 5:
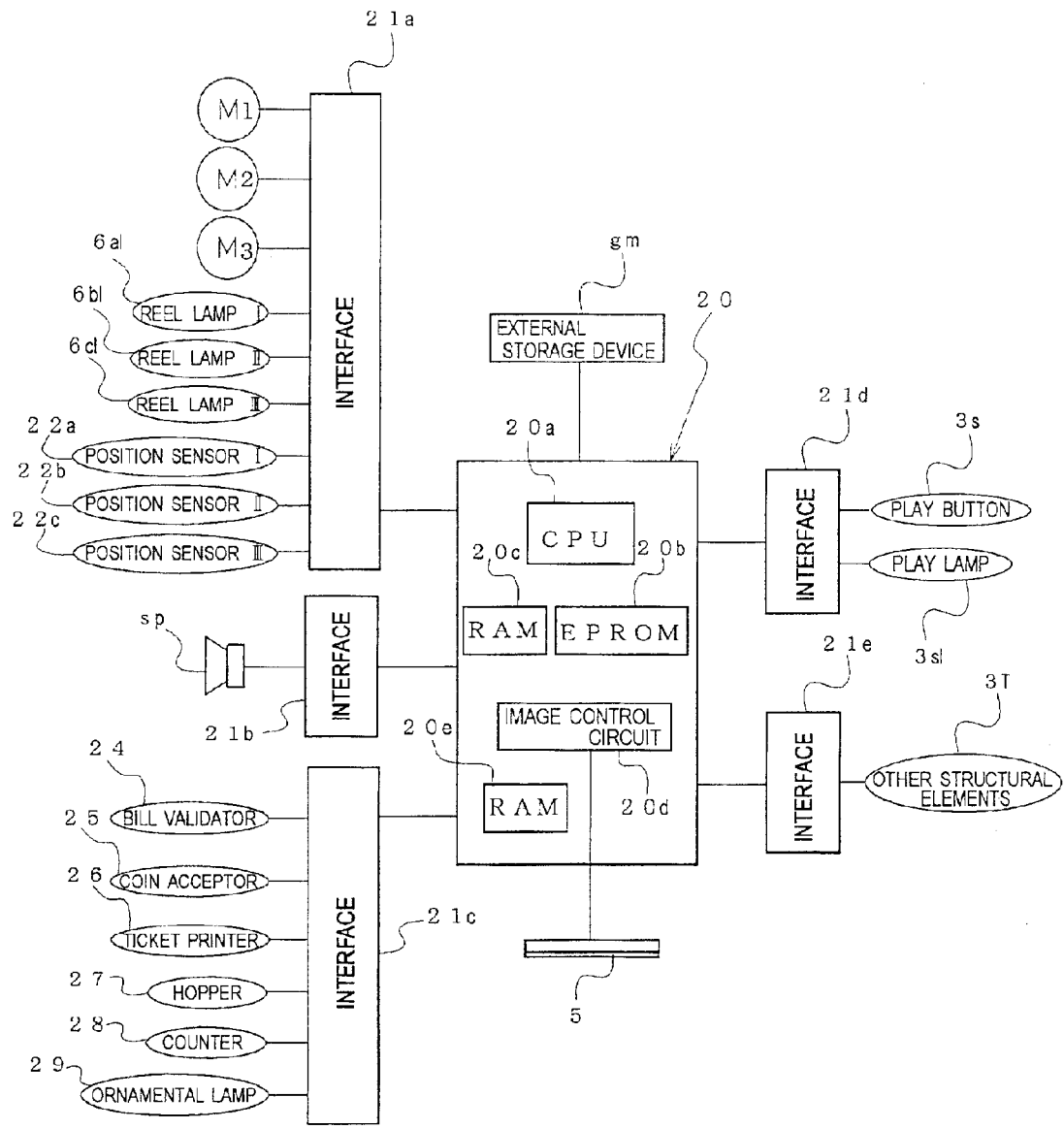
FIG. 5 is a diagram showing the structure of the control unit of the slot game machine illustrated in FIG. 1.

As shown in FIG. 5, the control unit 20 for controlling the slot game machine 1 is structured by comprising a CPU (central processing unit) 20a as the center of such control; an EPROM (Erasable and Programmable ROM) 20b having written thereon a control program in advance; a RAM (Random Access Memory) 20c for storing work data; an image control unit 20d for controlling image data and converting this into an analog signal and outputting the same; and a RAM 20e as a graphic memory, among others.

The series of movements of the slot game machine 1 is performed by the CPU 20a executing the control program stored in the EPROM 20b.

The foregoing control program processing are, for example, the drive and stop position control of the respective stepping motors for rotatably driving each mechanical reel 6a, 6b, 6c; game image output control, various processing such as the bet processing pursuant to the input operations of the player and calculation of the balance of the wager; control for printing and ejecting the exchange ticket; flashing operation control of various lamps; game sound output control, and so on.

Moreover, the EPROM 20b has the control data and table for performing the rotational drive stoppage control of the mechanical reels 6a, 6b, 6c.

The tables stored in the EPROM 20b are a winning design combination table, stoppage control table of the mechanical reels, and so forth.

The foregoing winning design combination table stores data prescribing the winning combination design for determining the realization of winning hands, and stores data on the prize to the provided to the player in accordance with the realization of various winning hands.

Here, the realization of the winning hands determined by the combination of designs displayed on the respective mechanical reels 6a, 6b, 6c in which the rotation has stopped is set by employing a random number arising in a prescribed probability among the random number generated with a random number generator.

The stoppage control table used in the stoppage control of the mechanical reel is recorded in association with the designs of the respective mechanical reels 6a, 6b, 6c and the arrangement thereof, and, when the relative positional relationship among one of the designs of the respective mechanical reels 6a, 6b, 6c is set forth, the mutual positional relationship of the other designs will be set forth naturally.

For example, when the number of designs of each mechanical reel 6a, 6b, 6c is 16, designs codes 1 to 16 are respectively provided to the designs 6an, . . . , 6bn, . . . , 6cn, . . . of each mechanical reel 6a, 6b, 6c, and, with the design of the design code 1 as the reference, the relative positional relationships of the other designs are recognized, and stoppage control is performed for the respective reels 6a, 6b, 6c.

The foregoing RAM 20c generates a work area upon executing the control program, temporarily stores variable data, and so on.

In other words, stored are data regarding whether the respective mechanical reels 6a, 6b, 6c are rotating or stopped; what designs are displayed on the respective mechanical reels 6a, 6b, 6c; whether the image reel is rotating or stopped, what the image designs are among the designs displayed on the image reel; how much the player p inserted; betting information; balance; won prize; and so on.

By executing the control program stored in the EPROM 20b, the CPU 20a is able to comprehensively perform the overall control of the slot game machine 1; for instance, control of the respective stepping motors for rotatably driving each of the foregoing mechanical reels 6a, 6b, 6c; output processing of the image signal to the image control circuit 20d; and various processing according to the input operations of the player.

The control unit 20 is connected to an external storage device gm such as a CD-ROM, and the external storage device gm creates and stores in advance, as image data of the game, the same number and type of image designs 6an", 6bn", 6cn" as the designs 6an, 6bn, 6cn on the peripheral face of the mechanical reels 6a, 6b, 6c as well as the representation pattern used in the image 5e.

Moreover, the control unit 20 is connected to a stepping motor M1, stepping motor M2 and stepping motor M3 for respectively driving the mechanical reels 6a, 6b, 6c; a reel lamp I (6al), reel lamp II (6bl) and reel lamp III (6cl) within the respective mechanical reels 6a, 6b, 6c; a position sensor I (22a), position sensor II (22b) and position sensor III (22c) for detecting the rotational position of the respective mechanical reels 6a, 6b, 6c, via the interface 21a including the motor drive circuit, sensor circuit, and so on.

Further, the control unit 20 is also connected to a speaker sp for generating game effect sounds via the interface 21b, this interface 21b is a sound circuit for decoding the sound signal and outputting this from the speaker sp as an audio signal.

In addition, the control unit 20 is also connected, via an interface 21c such as a chattering prevention circuit or the like, to a bill validator 24 for reading the bill inserted from the bill slot 2b; a coin acceptor 25 for checking whether the coin inserted from the coin slot 2a is genuine; a ticket printer 26 for printing the exchange ticket; a hopper 27 for paying coins at the end of the game in the case of cash settlement; a counter 28 which counts the amount inserted into or paid out from the slot game machine 1 for the game machine administrator; ornamental lamps 29 for providing game effect light; among others.

Further, the control unit 20 is also connected to structural elements 3T of other buttons and the like via an interface 21e.

Moreover, the CPU 20a in the control unit 20 is connected to the liquid crystal display panel 5 via the image control circuit 20d.

The CPU 20a reads the image designs 6an", 6bn", 6cn" and the image data of representation patterns and so on stored in the CD-ROM as the external storage device gm, creates an image signal thereby, and outputs such image signal to the image control circuit 20d.

In other words, by employing the image data of the image designs 6an", 6bn", 6cn", created are an image signal of the reel peripheral face image 5el of the rotating or stopped image reel similar to the peripheral face of the mechanical reels 6a, 6b, 6c having the designs 6an, 6bn, 6cn; and an image signal of the image 5e employing the image data of the representation patter.

Here, the reel peripheral face image 5el in rotation is created to be image-displayed at the same rotation angle speed as the rotation angle speed of the respective mechanical reels 6a, 6b, 6c.

The image control circuit 20d performs actual drawing processing, digital/analog conversion and the like by employing a RAM 20e as the graphic memory from the image signal input from the CPU 20a, outputs this as an RGB signal to the liquid crystal display panel 5, and this is displayed as an image on the liquid crystal display panel 5.

Next, the game display within the protective glass 1g in the slot game machine 1 is explained.

For example, in the virtual image display mode, as shown in FIG. 6, the image Se is displayed at the upper half area of the liquid crystal display panel 5, and a dark color is display all across the lower half area.

Simultaneously, the illuminance of the reel lamp I (6al), reel lamp 11 (6bl) and reel lamp III (6cl) is increased in the respective mechanical reels 6a, 6b, 6c in order to illuminate and conspicuously display the designs 6an, . . . , 6bn, . . . , 6cn, . . . on the peripheral face of the mechanical reels 6a, 6b, 6c, and reflects this on the half mirror 1m in order to display the virtual images 6an', 6bn', 6cn' on the lower half area 1Gs of the game display corresponding to the dark colored lower half area of the liquid crystal display panel 5.

In other words, the image 5e as the real image and the virtual images 6an', 6bn', 6cn' of the designs 6an, 6bn, 6cn are displayed on the same game display 1G.

In this case, the player p visually recognizes the image 5e on the upper half area of the liquid crystal display panel 5 at the upper half area 1Gu of the game display and visually recognizes the virtual images 6an', 6bn', 6cn' of the designs 6an, 6bn, 6cn of the respective mechanical reels 6a, 6b, 6c at the lower half area 1Gs of the game display through the protective glass 1g.

Here, the designs 6an, 6bn, 6cn of the respective mechanical reels 6a, 6b, 6c are illuminated brighter by the reel lamp I (6al), reel lamp II (6bl) and reel lamp III (6cl) the illuminance of which has been increased, reflected by the half mirror 1m, and clearly projected as the virtual images 6an', 6bn', 6cn', and at the same time the lower half area of the liquid crystal display panel 5 that constitutes the background of the virtual images 6an', 6bn', 6cn' is made of a dark color. As a result, the virtual images 6an', 6bn', 6cn' of the designs 6an, 6bn, 6cn of the respective mechanical reels 6a, 6b, 6c are displayed clearly, and the player p will feel that he/she is visually recognizing the designs 6an, 6bn, 6cn of the actual mechanical reels 6a, 6b, 6c.

Next, as shown in FIG. 7, while displaying the image 5e on the upper half area of the liquid crystal display 5, reel lamp I (6al), reel lamp II (6bl) and reel lamp III (6cl) within the mechanical reels 6a, 6b, 6c are turned off, and, in synchronization therewith, a reel peripheral face image 5el having the same visual recognition position as the image designs 6an", 6bn", 6cn" which are the same as the virtual images 6an', 6bn', 6cn' of the designs 6an, 6bn, 6cn of the mechanical reels 6a, 6b, 6c is displayed at the lower half area of the liquid crystal display 5. The image 5e and the reel peripheral face image 5el are displayed across the entire area of the game display within the protective glass 1g upon transferring the mode to the real image display mode.

Here, it is difficult for the player p to notice that the virtual images 6an', 6bn', 6cn' of the designs 6an, 6bn, 6cn of the mechanical reels 6a, 6b, 6c visually recognized through the protective glass 1g in the virtual image display mode has been switched to the image designs 6an", 6bn", 6cn" of the reel peripheral face image 5el of the real image display mode displayed by the liquid crystal display 5, and will visually recognize that the virtual images 6an', 6bn', 6cn' to be identical with the image designs 6an", 6bn", 6cn" of the reel peripheral face image 5el instantaneously synchronized and switched.

Therefore, by image-displaying a similar display of a virtual image of the mechanical reels 6a, 6b, 6c by employing the reel peripheral face image 5el displayed by the liquid crystal display 5, it is possible to advance the game while transferring the virtual image display mode to the real image display mode in continuation without the player p hardly noticing.

Contrarily, when transferring the real image display mode to the virtual image display mode, the routine is as follows.

In the real image display mode (c.f. FIG. 7) in which the image 5e and the reel peripheral face image 5el are displayed with the liquid crystal display 5, foremost, each of the mechanical reels 6a, 6b, 6c is rotated to a rotational position capable of displaying the designs 6an, 6bn, 6cn of the mechanical reels 6a, 6b, 6c identical to the image designs 6an", 6bn", 6cn" of the reel peripheral face image 5el as the virtual images 6an', 6bn', 6cn'.

Then, in the liquid crystal display 5, the reel peripheral face image 5el is non-displayed, a dark color is displayed thereto in synchronization, the reel lamp I (6al), reel lamp II (6bl) and reel lamp III (6cl) within the mechanical reels 6a, 6b, 6c are turned off, the designs 6an, 6bn, 6cn of the mechanical reels 6a, 6b, 6c identical to the image designs 6an", 6bn", 6cn" are illuminated, this is reflected on the half mirror lm so as to be displayed as the virtual images 6an', 6bn', 6cn' at the visual recognition position identical to the image designs 6an", 6bn", 6cn", and thereby transfers the mode to the virtual image display mode (c.f. FIG. 6).

Here, it is difficult for the player p to notice that the image designs 6an", 6bn", 6cn" of the reel peripheral face image 5el displayed with the liquid crystal display 5 visually recognized through the protective glass 1g in the real image display mode has been switched to the virtual images 6an', 6bn', 6cn' of the designs 6an, 6bn, 6cn of the mechanical reels 6a, 6b, 6c, and will visually recognize the image designs 6an", 6bn", 6cn" of the reel peripheral face image 5el to be identical with the virtual images 6an', 6bn', 6cn' of the designs 6an, 6bn, 6cn instantaneously synchronized and switched.

Therefore, by displaying a virtual image similar to the reel peripheral face image 5el display with the liquid crystal display 5 by employing the virtual images 6an', 6bn', 6cn' of the designs 6an, 6bn, 6cn of the mechanical reels 6a, 6b, 6c, it is possible to advance the game while transferring the real image display mode to the virtual image display mode in continuation without the player p hardly noticing.

As described above, in the real image display mode, since the lower half area 1Gs of the game display displayed to the player p is of a reel peripheral face image 5el displayed on the liquid crystal display 5, it becomes possible to display an image as though the actual mechanical reels 6a, 6b, 6c deform limply or as though the actual mechanical reels 6a, 6b, 6c are blown to pieces by employing the reel peripheral face image 5el, thereby enabled is a game display impossible with the game machine structure in which the observer visually recognizes actual the mechanical reels 6a, 6b, 6c.

Meanwhile, in the virtual image display mode, since the designs 6an, 6bn, 6cn on the peripheral face of the mechanical reels 6a, 6b, 6c are reflected on the half mirror lm and displayed to the player p as the virtual images 6an', 6bn', 6cn' at the lower half area 1Gs of the game display displayed to the player p, the mechanical reels 6a, 6b, 6c are visually recognized as in a game machine structured to directly view the actual mechanical reels, a realistic slot game can be displayed.

Further, the mutual transfer between the game display modes similar to the case where the mechanical reel and image reel are stopped is also possible between the virtual image display mode in which the mechanical reels 6a, 6b, 6c are rotating and the real image display mode of the reel peripheral face image 5el in which the image reel is rotating.

In this case, the image designs 6an", 6bn", 6cn" of the reel peripheral face image 5el are displayed to the player p having the same type and size of design as the designs 6an, 6bn, 6cn of the mechanical reels 6a, 6b, 6c, the displayed to the player p in the same order as the virtual image 6an', 6bn', 6cn' of the designs 6an, 6bn, 6cn.

Moreover, the rotating reel peripheral face image 5el is structured to be displayed to the player p by moving the image designs 6an", 6bn", 6cn" at the same rotation angle speed as the rotation angle speed of the peripheral face of the mechanical reels 6a, 6b, 6c.

For instance, when there are 16 designs for each of the designs 6an, 6bn, 6cn of the mechanical reels 6a, 6b, 6c, there are 16 image designs for each of the image designs 6an", 6bn", 6cn" identical to the respective designs 6an, 6bn, 6cn, and are displayed to the player p in the same order as the virtual images 6an', 6bn', 6cn' of the designs 6an, 6bn, 6cn.

Further, the rotating reel peripheral face image 5el is displayed to the player p by moving the 16 image designs 6an", 6bn", 6cn" at the same rotation angle speed as the rotation angle speed of the peripheral face of the mechanical reels 6a, 6b, 6c.

For example, in the virtual image display mode which displays the virtual images 6an', 6bn', 6cn' of the designs 6an, 6bn, 6cn of the rotating mechanical reels 6a, 6b, 6c, it is possible to transfer the mode to the real image display mode by displaying on the liquid crystal display 5 the reel peripheral face image 5el in which the image reel is rotating synchronously with the mechanical reel, in synchronization with the extinguishment of the reel lamp I (6al), reel lamp U (6bl) and reel lamp III (6cl).

Contrarily, when transferring the real image display mode to the virtual image display mode, in the real image display mode which displays on the liquid crystal display 5 the reel peripheral face image 5el in which the image reel is rotating, the reel peripheral face image 5el is non-displayed, a dark color is displayed thereto in synchronization, the reel lamp I (6al), reel lamp II (6bl) and reel lamp III (6cl) are turned off, the virtual images 6an', 6bn', 6cn' of the designs 6an, 6bn, 6cn of the mechanical reels 6a, 6b, 6c rotating in synchronization with the image reel in advance identical are displayed, and thereby transfers the mode to the virtual image display mode.

In the case of the rotating reel, also, it is possible to transfer the virtual image display mode to the real image display mode, or transfer the real image display mode to the virtual image display mode without the player p hardly noticing.

Next, the transfer control from the virtual image display mode (c.f. FIG. 6) to the real image display mode in the slot game machine 1 is described (c.f FIG. 7).

Figure 8A:
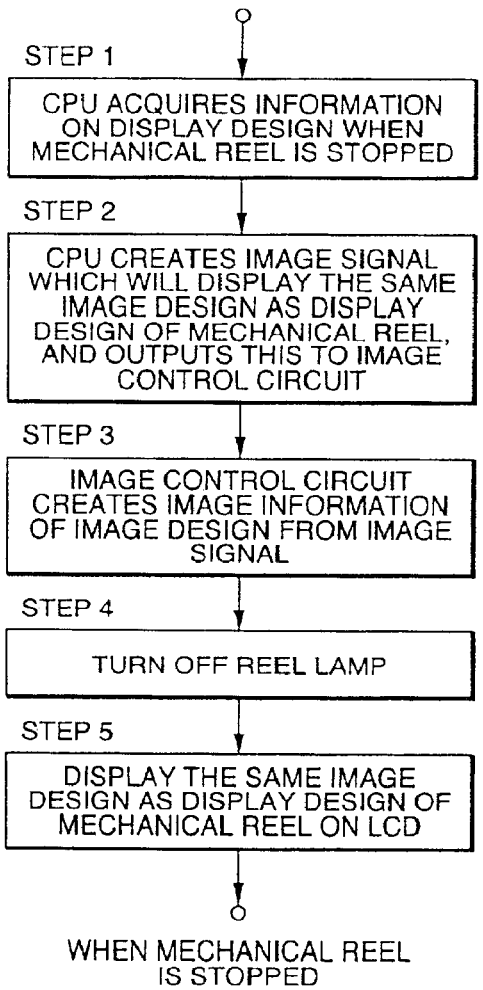
FIG. 8(a) and FIG. 8(b) are respectively a processing flowchart when the mechanical reel is stopped and a processing flowchart when the mechanical reel is rotating during the transfer from the virtual image game display of the mechanical reel peripheral face design to the game display of an image design of the reel peripheral face image.

In the virtual image display mode shown in FIG. 6, the case of the virtual images 6an', 6bn', 6cn' of the designs 6an, 6bn, 6cn of the mechanical reels 6a, 6b, 6c, being displayed, and the mechanical reels 6a, 6b, 6c are stopped is explained with reference to FIG. 8(a).

By the foregoing control program being executed, as shown in FIG. 6, the CPU 20a reads and acquires from the storage area of the RAM 20c the virtual image display design work data of the respective reels of a certain numerical value of 1 to 16 representing the design of the designs 6an, 6bn, 6cn of the mechanical reels 6a, 6b, 6c, which is the real image of the virtual images 6an', 6bn', 6cn' visually recognized by the player p when the mechanical reels 6a, 6b, 6c are stopped (step 1).

Thereafter, the CPU 20a creates an image signal of the reel peripheral face image 5el having the image designs 6an", 6bn", 6cn" of the identical design corresponding to the virtual image display design work data at a visual recognition position identical to the virtual images 6an', 6bn', 6cn' of the designs 6an, 6bn, 6cn from the image data stored in the external storage device gm by employing the virtual image display work data acquired in (step 1), and outputs this to the image control circuit 20d. (step 2).

The image control circuit 20d creates image information of the reel peripheral face image 5el having the image designs 6an", 6bn", 6cn" from the input image signal (step 3).

The CPU 20a transmits the signal to the reel lamp I (6al), reel lamp II (6bl) and reel lamp III (6cl), and turns them off (step 4).

While the CPU 20a transmits the signal to the reel lamp I (6al), reel lamp II (6bl) and reel lamp III (6cl), and turns them off (step 4), in synchronization therewith, the image control circuit 20d outputs the image information of the created reel peripheral face image 5el to the liquid crystal display panel 5, and the liquid crystal display panel 5 displays the reel peripheral face image 5el having the image designs 6an", 6bn", 6cn" on the lower half area 1Gs of the game display (step 5).

Figure 8B:
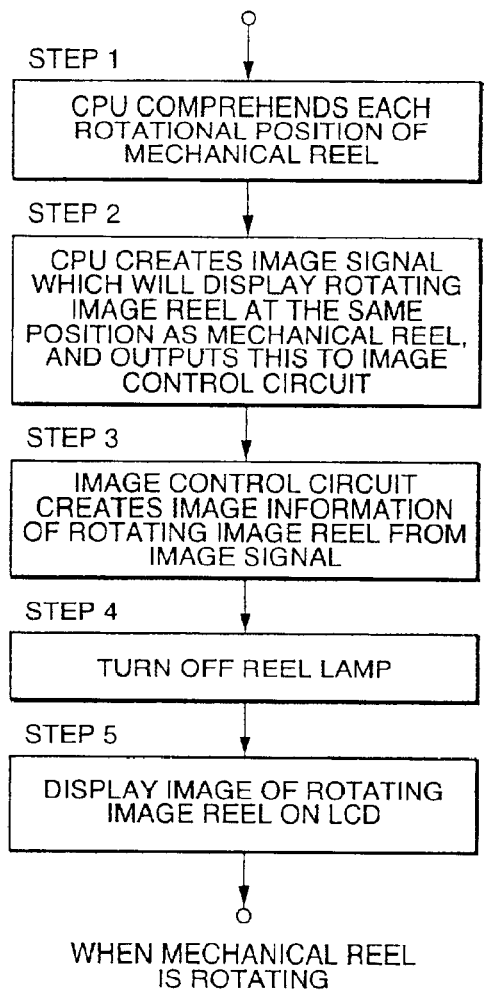

Meanwhile, in the virtual image display mode, the case of the virtual images 6an', 6bn', 6cn' of the designs 6an, 6bn, 6cn of the mechanical reels 6a, 6b, 6c being displayed, and the mechanical reels 6a, 6b, 6c are rotating is explained with reference to FIG. 8(b).

By the foregoing control program being executed, the CPU 20a reads and acquires the reel rotational position data stored in the storage area of the RAM 20c detected by the position sensor I (22a), position sensor II (22b) and position sensor III (22c) for detecting the rotation of the mechanical reels 6a, 6b, 6c, and comprehends the respective rotational positions of the mechanical reels 6a, 6b, 6c (step 1).

Next, the CPU 20a creates an image signal for displaying the reel peripheral face image 5el having the image designs 6an", 6bn", 6cn" which rotate in synchronization with the same rotational position and rotational angle speed of the respective mechanical reels 6a, 6b, 6c comprehended at (step 1) upon employing the image data stored in the external storage device gm, and outputs this to the image control circuit 20d (step 2).

The image control circuit 20d creates image information for displaying the reel peripheral face image 5el having the image designs 6an", 6bn", 6cn" which rotate in synchronization with the same visual recognition position and rotational angle speed of the mechanical reels 6a, 6b, 6c from the input image signal (step 3).

The CPU 20a transmits the signal to the reel lamp I (6al), reel lamp II (6bl) and reel lamp III (6cl), turns them off, and non-displays the virtual images 6an', 6bn', 6cn' (step 4).

While the CPU 20a transmits the signal to the reel lamp I (6al), reel lamp II (6bl) and reel lamp III (6cl), and turns them off, in synchronization therewith, the image control circuit 20d outputs the image information for displaying the rotating reel peripheral face image 5el in synchronization at the same image design position and the identical rotational angle speed with the designs on the peripheral face of the mechanical reels 6a, 6b, 6c to the liquid crystal display panel 5, and the liquid crystal display panel S displays the rotating reel peripheral face image 5el on the lower half area 1Gs of the game display (step 5).

Next, the transfer control from the real image display mode (c.f. FIG. 7) to the virtual image display mode (c.f. FIG. 6) in the slot game machine 1 is described.

Figure 9A:
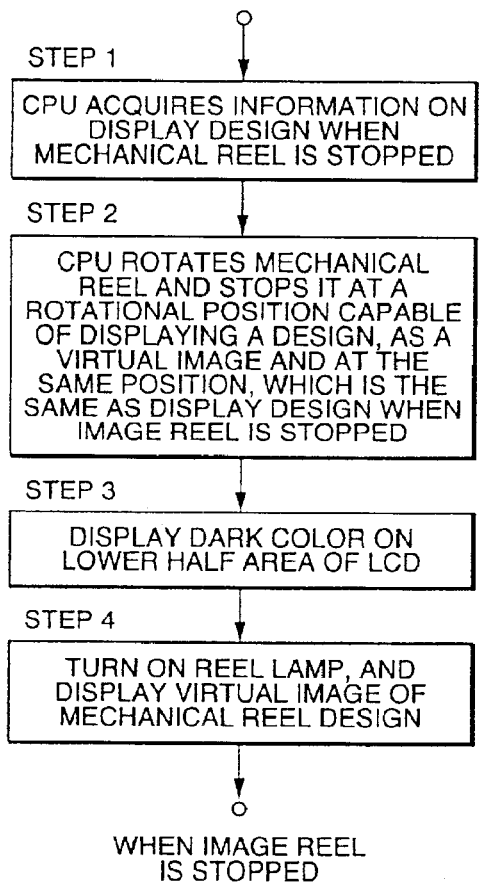
FIG. 9(a) and FIG. 9(b) are respectively a processing flowchart when the mechanical reel is stopped and a processing flowchart when the mechanical reel is rotating during the transfer from the image design game display of the reel peripheral face image to the virtual image game display of the mechanical reel peripheral face design.

In the real image display mode shown in FIG. 7, the case of the design images 6an", 6bn", 6cn" of the reel peripheral face image 5el being displayed, and the image reels are stopped is explained with reference to FIG. 9(a).

By the foregoing control program being executed, as shown in FIG. 7, the CPU 20a reads and acquires from the storage area of the RAM 20c the image display design work data of the respective image reels of a certain numerical value of 1 to 16 representing the design of the image designs 6an", 6bn", 6cn" of the stopped reel peripheral face image 5el visually recognized by the player p, and specifies the design (step 1).

Thereafter, the CPU 20a sends a signal to the stepping motor M1, stepping motor M2 and stepping motor M3 and respectively rotates the mechanical reels 6a, 6b, 6c, and stops the respective reels at a rotational position such that the image designs 6an", 6bn", 6cn" corresponding to the image display design work data and the virtual images 6an', 6bn', 6cn' of the designs 6an, 6bn, 6cn, which are identical to the foregoing image designs, are displayed at the same visible recognition position (step 2).

Then, the CPU 20a sends a signal to the image control circuit 20d and displays a dark color instead of the non-display of the reel peripheral face image 5el in the lower half area of the liquid crystal display panel 5 (step 3).

While the CPU 20a displays a dark color in place of the non-display of the reel peripheral face image 5el and transmits the signal to the unlit reel lamp I (6al), reel lamp II (6bl) and reel lamp III (6cl), and turns them on, it further illuminates and conspicuously displays the designs 6an, 6bn, 6cn of the mechanical reels 6a, 6b, 6c, reflects this on the half mirror 1m, and displays the virtual images 6an', 6bn', 6cn' of the designs 6an, 6bn, 6cn at the lower half area 1Gs of the game display corresponding to the dark colored lower half area of the liquid crystal display panel 5 (c.f. FIG. 6) (step 4).

Figure 9B:
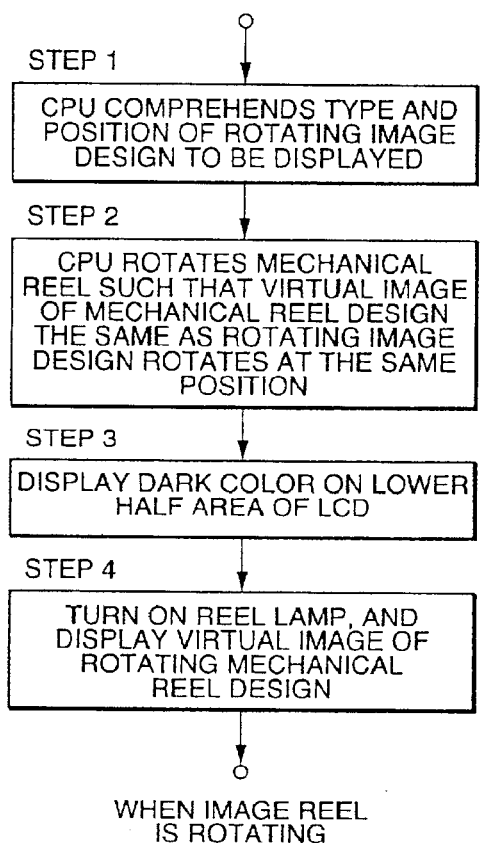

Meanwhile, in the real image display mode, the case of the design images 6an", 6bn", 6cn" of the reel peripheral face image 5el being displayed, and the image reels are rotating is explained with reference to FIG. 9(b).

By the foregoing control program being executed, the CPU 20a comprehends from the creation processing of the image signal the type and position of the respective image designs 6an", 6bn", 6cn" rotating and displayed in the reel peripheral face image 5el.

For example, it comprehends the type of each of such image designs 6an", 6bn", 6cn" in a correct position against the player p (step 1).

Next, the CPU 20a sends a signal to the stepping motor M1, stepping motor M2 and stepping motor M3 and rotates the mechanical reels 6a, 6b, 6c such that the designs 6an, 6bn, 6cn on the peripheral face of the mechanical reels 6a, 6b, 6c, which have the same designs as each of the rotating image designs 6an", 6bn", 6cn", rotate in synchronization therewith.

In other words, in the reel peripheral face image 5el, the mechanical reels 6a, 6b, 6c are rotated in synchronization such that the virtual images 6an', 6bn', 6cn', which has the same design as the respective designs 6an, 6bn, 6cn on the peripheral face of the mechanical reels 6a, 6b, 6c displayed to the player p, rotate in the same visible recognition position, with respect to each of the rotating design images 6an", 6bn", 6cn" displayed to the player p.

For example, the type of each of such image designs 6an", 6bn", 6cn" positioned to be displayed correctly to the player p at a certain timing is comprehended (step 1), and the mechanical reels 6a, 6b, 6c are rotates in synchronization such that the respective designs 6an, 6bn, 6cn on the peripheral face of the mechanical reels 6a, 6b, 6c having the same design are displayed as the virtual images 6an', 6bn', 6cn' in a correct position to the player p at the same timing (step 2). Then, the CPU 20a transmits a signal to the image control unit 20d and non-displays the rotating reel peripheral face image 5el displayed on the lower half area of the liquid crystal display panel 5, and instead displays a dark color (step 3).

While the CPU 20a displays a dark color in place of the non-display of the reel peripheral face image 5el and transmits the signal to the unlit reel lamp I (6al), reel lamp II (6bl) and reel lamp III (6cl) and turns them on, it further illuminates and conspicuously displays the designs 6an, 6bn, 6cn of the rotating mechanical reels 6a, 6b, 6c, reflects this on the half mirror 1m, and displays the virtual images 6an', 6bn', 6cn' of the rotating designs 6an, 6bn, 6cn at the lower half area 1Gs of the game display corresponding to the dark colored lower half area of the liquid crystal display panel 5 (step 4).

Moreover, in the embodiments described above, as illustrated in FIG. 4, description was made on an example where the image 5e of the liquid crystal display panel 5 is displayed on the upper half area 1Gu of the game display to be visually recognized by the player p and the designs 6an, 6bn, 6cn of the mechanical reels 6a, 6b, 6c are displayed on the lower half area 1Gs as the virtual images 6an', 6bn', 6cn' reflected on the half mirror 1m. However, in addition to this game display arrangement, for instance, the designs 6an, 6bn, 6cn of the mechanical reels 6a, 6b, 6c may be displayed on the upper half area 1Gu as the virtual images 6an', 6bn', 6cn' reflected on the half mirror 1m and the image 5e of the liquid crystal display panel 5 is displayed on the lower half area 1Gs, or the game display area may be divided into an upper area, center area and lower area, such that the designs 6an, 6bn, 6cn of the mechanical reels 6a, 6b, 6c are displayed at the center area of the game display as the virtual images 6an', 6bn', 6cn' upon being reflected on the half mirror 1m, and the image 5e of the liquid crystal display panel 5 may be displayed on the upper area and lower area. The arrangement of the virtual images 6an', 6bn', 6cn' of the designs 6an, 6bn, 6cn of the mechanical reels 6a, 6b, 6c and the image 5e of the liquid crystal display panel 5 may be suitably and arbitrarily selected.

According to the foregoing structure, in the game display area visually recognized through the protective glass, it is possible to play a slot game having the same realism as a game machine display actual mechanical reels since the mechanical reels are disposed inside the top box positioned above the game display unit, reflecting the designs of the mechanical reel peripheral face on the half mirror and displaying this as a virtual image.

Moreover, since the game display is started from the display of design the mechanical reel peripheral face as a virtual image by reflecting the same on a half mirror, and then images of the image design of the image reel peripheral face identical to the virtual image of the design of the mechanical reel peripheral face is displayed to the same visual recognition position by means of a liquid crystal display panel, in synchronization with extinguishing the reel lamps to stop the illumination to the designs on the mechanical reel peripheral face and thereby ending the display of the virtual image, it is possible to proceed the game while smoothly transferring the virtual image display mode which displays a virtual image of the design of the mechanical reel peripheral face to the real image display mode which displays the image design of the image reel peripheral face without the player p noticing such transfer.

Therefore, by transferring the virtual image display having a fantasy employing the virtual image of the design of the actual mechanical reel peripheral face to the real image display mode which displays the image design of the image reel peripheral face, in the real image display mode, it becomes possible to display an image as though the actual mechanical reels deform limply or as though the actual mechanical reels are blown to pieces.

Thus, enabled is a game display employing changes in the mode of the mechanical reels, which was impossible with the game machine structure in which the observer visually recognizes actual the mechanical reels.

Moreover, since a transfer is made from a real image display mode which displays the image designs on the liquid crystal display panel to a virtual image display mode in which the mechanical reels is rotated, the design on the peripheral face of the mechanical reels that are identical to the image designs displayed on the liquid crystal display panel are illuminated and displayed distinctly, in synchronization with ending the display of the image designs, and such displayed images are reflected by the half mirror to display the virtual images of the design, at the same visibly recognized position, it is possible to perform the transfer from the real image display mode which displays the image design on the peripheral face of the image reel to the virtual image display mode which displays virtual image of the design on the peripheral face of the mechanical reel so smoothly that such transfer is hardly recognized by the player p.

Therefore, the transfer between the game display by a virtual image of a real item and the game display by an image becomes possible, and thereby realized is an image mutual transfer and succession method of a virtual image and a real image capable of realizing the successful combination of the reality of the real item and the fantasy of the real image, and enabling a rich representation.

Further, although a slot game machine was exemplified in the foregoing embodiments, it goes without saying that the image mutual transfer and succession method according to the present invention may be effectively employed in displays of other game machines or displays of other equipment.

What is claimed is:

1. An image mutual transfer and succession method between a virtual image and a real image which switches, as required, between display of a virtual image of a real item as a reflected image by a half mirror and display of a real image as a half mirror transmitted image from a display provided behind said half mirror;

wherein mutual take-over control of images is performed by structuring the real image by said display to be apparently identical to said virtual image, displaying the real image on said display in synchronization with the dimming of illumination to said real item when displaying the real image, and brightening the illumination to said real item in synchronization with the stoppage of the real image display on said display device when displaying the virtual image.

2. An image mutual transfer and succession method between a virtual image and a real image according to claim 1, wherein said real item is a design drawn on the peripheral face of a mechanical reel.

* * * * *